(12) United States Patent
Dong et al.

(10) Patent No.: US 11,402,641 B1
(45) Date of Patent: Aug. 2, 2022

(54) ACOUSTIC UNIT FOR WEARABLE DEVICE

(71) Applicant: AMAZON TECHNOLOGIES, INC., Seattle, WA (US)

(72) Inventors: Jianchun Dong, Palo Alto, CA (US); Zhen Sun, Boston, MA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 16/919,534

(22) Filed: Jul. 2, 2020

(51) Int. Cl.
*G02B 27/01* (2006.01)
*G02C 11/00* (2006.01)

(52) U.S. Cl.
CPC .......... *G02B 27/0176* (2013.01); *G02C 11/10* (2013.01); *G02B 2027/0178* (2013.01)

(58) Field of Classification Search
CPC ........ G02B 27/0176; G02B 2027/0178; G02C 11/10
See application file for complete search history.

(56) References Cited

U.S. PATENT DOCUMENTS

| | | | | |
|---|---|---|---|---|
| 6,144,738 | A * | 11/2000 | Hawker | H04M 1/03 379/433.02 |
| 2014/0029762 | A1 * | 1/2014 | Xie | H04R 5/027 381/94.1 |
| 2017/0353793 | A1 * | 12/2017 | Sun | H04R 1/323 |
| 2018/0302727 | A1 * | 10/2018 | Deas | H04R 1/245 |

OTHER PUBLICATIONS

"1216CS99 Speaker Specification", Sunway Communication, 2 pgs. Retrieved from the Internet: URL: http://en.sz-sunway.com/product/acoustics/speaker/269.html.
"Acoustic Mesh Gaskets", Marian, Inc., Mar. 27, 2014, 2 pgs. Retrieved from the Internet: URL: https://marianinc.com/acoustic-mesh/.
"Giving Acoustic Vents Superior Performance", Porelle Acoustic, 3 pgs. Retrieved from the Internet: URL: https://www.porelleacoustic.com/.
"Goertek Components", Speaker & Receiver, 6 pgs. Retrieved from the Internet: URL: https://goertek.com/en/content/details20_877.html.
"Porelle Acoustic Membrane Specification", PIL Membranes, Ltd., Marian, Inc., Nov. 6, 2019, 1 pg. Retrieved from the Internet: URL: https://marianinc.com/wp-content/uploads/2019/09/2019-09-27-DS-S-Porelle-Acoustic-Membrane-AV4ID.pdf.

(Continued)

*Primary Examiner* — Robert J Michaud
(74) *Attorney, Agent, or Firm* — Lindauer Law, PLLC

(57) ABSTRACT

A hybrid acoustic unit operates as an acoustic monopole for frequencies of audio output below a threshold frequency and as an acoustic quadrupole for frequencies above the threshold frequency. A first transducer provides the low frequencies below the threshold frequency while a second transducer provides the high frequencies above the threshold frequency. The low frequencies improve perceived loudness to a user while being masked from bystanders due to ambient noise. A region of an acoustic pattern produced by the acoustic quadrupole is directed towards an ear of the user. This improves audibility to the user while substantially reducing loudness of those high frequencies to bystanders.

22 Claims, 8 Drawing Sheets

(56) References Cited

OTHER PUBLICATIONS

"Speaker Basics", Harris Technologies, Inc., 11 pgs. Retrieved from the Internet: URL: https://www.ht-audio.com/pages/SpeakerBasics.html.

Dickens, et al., "Improved Precision in Measurements of Acoustic Impedance Spectra Using Resonance-Free Calibration Loads and Controlled Error Distribution", Journal of the Acoustical Society of America, vol. 121, No. 3, Mar. 2007, 11 pgs. Retrieved from the Internet: URL: https://newt.phys.unsw.edu.au/jw/reprints/DickensSmithWolfe.pdf.

Wolfe, Joe, "Impedance Heads and Acoustic Impedance Spectrum Measurements," The University of New South Wales, School of Physics, Music Acoustics, 4 pgs. Retrieved from the Internet: URL: https://newt.phys.unsw.edu.au/iw/acoustic-impedance-measurement.html.

Wolfe, Joe, "What is Acoustic Impedance and Why is it Important?," The University of New South Wales, School of Physics, Music Acoustics, 5 pgs. Retrieved from the Internet: URL: https://newt.phys.unsw.edu.au/jw/z.html.

\* cited by examiner

US 11,402,641 B1

ACOUSTIC UNIT FOR WEARABLE DEVICE

BACKGROUND

Wearable devices provide many benefits to users, allowing easier and more convenient access to information and services. Wearable devices may provide output that is audible to the user.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
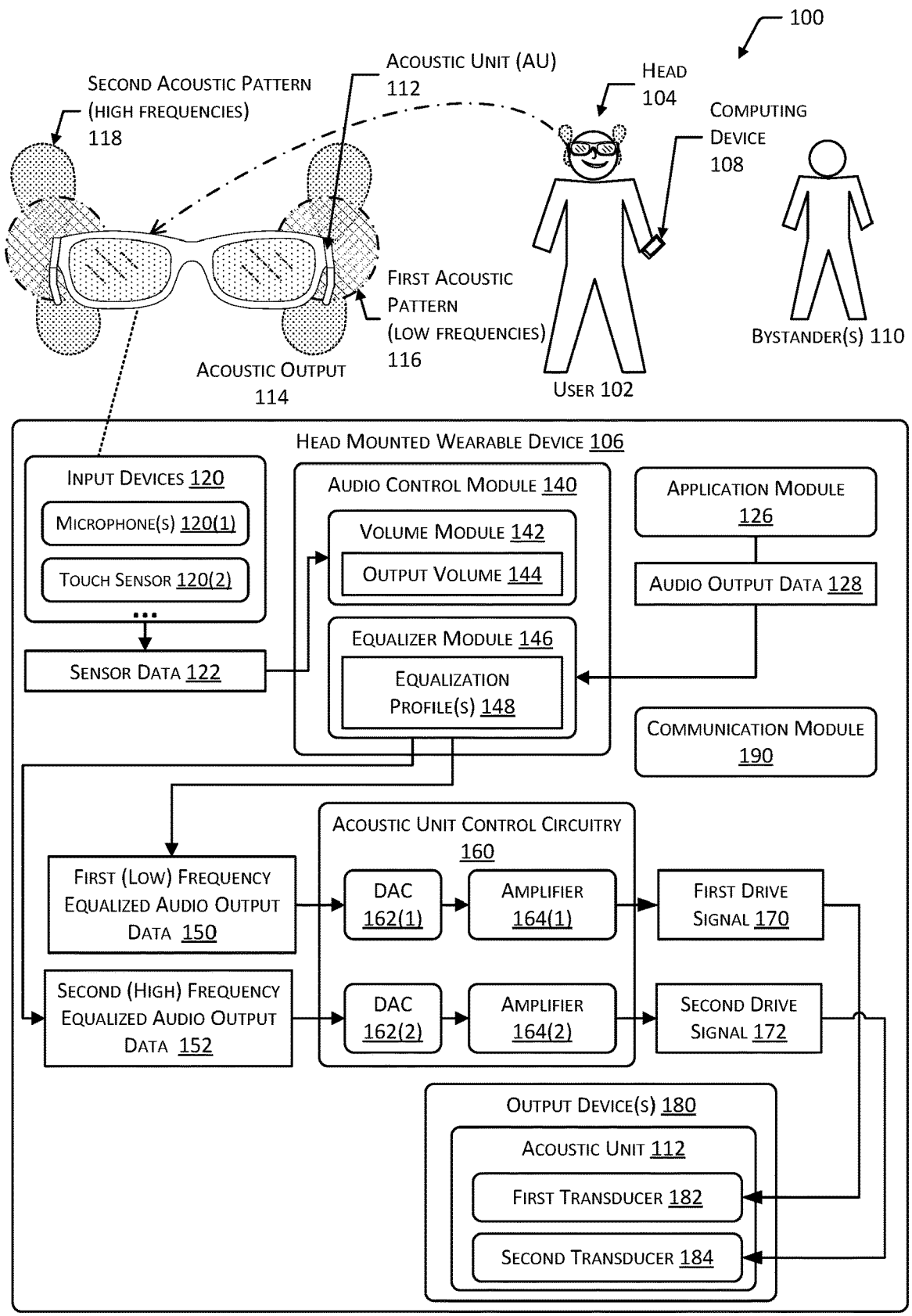
FIG. 1 depicts a system including a head-mounted wearable device (HMWD) equipped with acoustic units (AU) operated to minimize sound leakage to bystanders, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

The structures depicted in the following figures are not necessarily according to scale. Furthermore, the proportionality of one component to another may change with different implementations. In some illustrations the scale or a proportionate size of one structure may be exaggerated with respect to another to facilitate illustration, and not necessarily as a limitation.

DETAILED DESCRIPTION

Wearable devices provide many benefits to users, allowing easier and more convenient access to information and services. For example, a head-mounted wearable device (HMWD) having a form factor that is ubiquitous and easily worn, such as eyeglasses, may facilitate access to information.

The HMWD may operate independently as a standalone device, or may operate in conjunction with another computing device. For example, the HMWD may operate in conjunction with a smart phone, tablet, network service operating on servers, and so forth. The HMWD includes input devices and output devices that provide a user interface to the user. In one implementation, the HMWD may use the computing device to provide access to a wide area network, compute resources, data storage, a display for image output, and so forth.

Among the input devices, the HMWD may include one or more microphones, such as an air conduction microphone (ACM) that detects sounds transferred by air. The HMWD may also include other sensors, such as touch sensors, an inertial measurement unit (IMU) comprising one or more accelerometers or gyroscopes, ambient light sensors (ALS), and so forth.

The HMWD may be used in situations in which bystanders or microphones of other devices are present. In such situations, it is desirable to allow the user wearing the HMWD to be able to listen to audio output without being obtrusive to those bystanders. Additionally, the user may not wish the audio to be intelligible to the bystanders. For example, the user may not wish to have the audio of a telephone call heard by the bystanders. Additionally, the user of the HMWD may not wish to obscure their ears and their hearing of the ambient environment. For example, the user may not wish to wear earplugs that would prevent conversation with bystanders or obscure the user's ability to hear what is happening in the environment.

Described in this disclosure are acoustic units and systems to drive transducers in those acoustic units to provide sound that is audible to the user but is inaudible or unintelligible to bystanders. The HMWD includes as an output device one or more acoustic units (AU). The AU provides sound that is audible to the user during operation while minimizing leakage to the surrounding environment when operated as described herein.

The acoustic unit comprises a first transducer and a second transducer within an enclosure. In one implementation the transducer, such as a voice coil, may drive a diaphragm. The transducer converts electrical signals into mechanical motion. During operation, the transducer moves the diaphragm to displace air, producing sound. The diaphragm acts as a pair of acoustic point sources with opposing outputs that are 180 degrees out of phase. For example, when driven, a first side of the diaphragm produces a positive sound pressure compression wave with a first amplitude while the opposite second side of the diaphragm produces a negative sound pressure rarefaction wave with the first amplitude.

During operation, the first transducer generates low frequency sound while the second transducer generates high frequency sound. Sound produced by the transducers is directed from inside the enclosure to the outside environment by one or more ports. A first cavity within the enclosure is bounded by the first transducer while a second cavity within the enclosure is bounded by the first transducer and the second transducer. The arrangement of the ports in the enclosure produces an acoustic monopole at low frequencies and an acoustic quadrupole at high frequencies.

A first acoustic pattern generated by the acoustic monopole for low frequency sound is approximately omnidirectional. However, ambient noise in the surrounding environment typically contains significant low frequency noise. As a result, the ambient noise masks the output from the acoustic monopole.

A second acoustic pattern generated by the acoustic quadrupole for high frequency sound includes multiple regions or lobes. In one implementation, a longitudinal acoustic quadrupole is used that creates two regions. The second acoustic pattern is configured so that during operation, the ear of the user is within a first region while a second region is directed generally upwards and away from bystanders. The high frequency sound is thus directed toward the user and away from the bystanders.

This configuration of acoustic unit results in a substantial reduction in power consumption during operation. User perception of loudness is highly dependent on low frequency components of audio presented. Because of the first transducer and the acoustic monopole operation, these low frequency sounds are more efficiently generated, improving perceived loudness fora given input power level. Additionally, because of the second acoustic pattern, a substantial portion of higher frequency sound is directed directly at the user's ear. For example, the two-region acoustic pattern created by the longitudinal acoustic quadrupole results in half of the high frequency sound energy being directed at the user's ear.

An audio control module may be responsive to one or more inputs such as ambient noise level, output volume setting of the HMWD, or audio type of the audio to be presented. Audio output data may be provided by an application, such as a telephone application, music player application, and so forth. The audio output data may comprise pulse code modulated (PCM) data representative of an analog audio signal.

The audio output data may be processed by applying an equalization profile to provide equalized audio output data. The equalization profile, when applied to the audio output data, introduces gain that selectively amplifies or attenuates one or more frequency bands. For example, the equalization profile may be used to "flatten" the response of a transducer that otherwise exhibits a sharp resonance peak at a particular frequency and improve the quality of the sound when presented by the acoustic unit. Different equalization profiles may be used to generate audio output for different frequency ranges. A low frequency range of the audio data may be processed using a first equalization profile to generate first frequency equalizer audio output data. A high frequency range of the audio data may be processed using a second equalization profile. In some implementations, particular equalization profiles may be selected from a plurality of available equalization profiles based on the output volume.

During operation of the system the first equalized audio output data is used to operate the first transducer while the second equalized audio output data is used to operate the second transducer. The first equalized audio output data may be provided as input to a first digital to analog converter (DAC) that produces as output a first analog signal. The first analog signal may then be amplified by a first amplifier to produce a first drive signal that is used to drive the first transducer. The second equalized audio output data may be provided as input to a second DAC that produces as output a second analog signal. The second analog signal may then be amplified by a second amplifier to produce a second drive signal that is used to drive the second transducer.

The HMWD may have other output devices, such as a visual indicator device (VID). The VID may comprise a light emitting diode (LED) that emits light from a portion of a frame of the HMWD within the user's field of view. In some implementations, the user may be provided with an indicator as to how far the sound from the HMWD is expected to carry. This may be based on characteristics of the audio control module, sensor data, or a combination thereof. For example, the visual indicator device (VID) may be illuminated based on one or more operating parameters of the audio control module. Continuing the example, if the output volume is set to maximum and an ambient noise level as indicated by audio input data is less than a first threshold value, the VID may be illuminated red, indicating that bystanders within a specified distance may be able to hear the presented audio clearly. Similarly, if the output volume is set to maximum and the ambient noise level is greater than a second threshold value, the VID may be illuminated green, indicating that bystanders within the specified distance are likely unable to hear the presented audio clearly.

The techniques and systems described in this disclosure may be used with regard to other devices or environments. The acoustic units and audio control module may be used to provide output within a vehicle, office, home, theater, and so forth. For example, the acoustic units may be installed within a vehicle to allow one occupant to listen to audio while minimizing leakage of that audio to other occupants. In another implementation, the acoustic units may be installed and used within furniture. For example, a chair may have acoustic units installed such that they are near the head of a user sitting in the chair and provide audio to the seated user while minimizing leakage of sound beyond the chair.

By utilizing the devices and techniques described in this disclosure, sound from the acoustic unit is audible to a user, while reducing one or more of the intelligibility or amplitude of sound perceived by bystanders or microphones in the environment. This improves privacy for the user while also minimizing adverse impact on bystanders resulting from hearing unwanted audio. The user may thus maintain the functionality to utilize audio output while reducing the likelihood of annoyance of or eavesdropping by bystanders.

Illustrative System

FIG. 1 depicts a system 100 in which a user 102 is wearing on their head 104 a head-mounted wearable device (HMWD) 106 in a general form factor of eyeglasses. The HMWD 106 may incorporate hinges to allow the temples of the eyeglasses to fold. The HMWD 106 may include one or more lenses. The lenses may be shaped to provide a particular refractive effect on light rays, such as in the case of prescription lenses.

The HMWD 106 may be in communication with one or more affiliated computing devices 108. For example, the HMWD 106 may communicate with the computing device 108 using a personal area network (PAN) such as Bluetooth. The computing device 108 may be used at least in part to provide additional resources, such as access to the network, compute resources, storage, display output, and so forth. The computing devices 108 may comprise a smart phone, tablet, local server, in vehicle computer system, and so forth. For example, the computing device 108 may comprise a smart phone that includes a display. The display of the smart phone may be used to present a graphical user interface.

In some situations, there may be bystanders 110 near the HMWD 106. For example, the user 102 wearing the HMWD 106 may be standing in a crowd, sitting on a bus, sitting in an auditorium, walking down a street, and so forth. The HMWD 106 may include one or more acoustic units (AUs) 112 that are used to provide acoustic output 114 to the user 102. An AU 112 produces a first acoustic pattern 116 for low frequencies and produces a second acoustic pattern 118 for high frequencies, as described in more detail below.

The HMWD 106 may include one or more input devices 120. For example, the HMWD 106 may include one or more of a microphone 120(1), touch sensor 120(2), button, ambient light sensor (ALS), and so forth. The input devices 120 may produce sensor data 122. In some implementations, a sensor may be used to determine if the HMWD 106 is being worn or not. For example, a proximity sensor may be used to determine if the head 104 of the user 102 is near the HMWD 106.

The microphones 120(1) may include one or more of bone conduction microphones (BCM), air conduction microphones (ACM), and so forth. The microphones 120(1) are used to produce sensor data 122. For example, the BCM may comprise an accelerometer, gyroscope, vibration sensor, and so forth that detect the vibrations in the head 104 of the user 102 that result from utterances of the user 102. The ACM may comprise a diaphragm or other elements that move in response to the displacement of air by sound waves. The audio input data may comprise digitized audio, such as pulse code modulated (PCM) audio data.

The touch sensor 120(2) may be located on one or more of the temples of the HMWD 106. The touch sensor 120(2) may comprise a capacitive touch sensor, a force sensitive resistor touch sensor, an optical touch sensor, and so forth. The touch sensor 120(2) may generate touch sensor data 122 that is indicative of the location, direction, duration and so forth of the touch. For example, the touch sensor data 122 may comprise a serialized data stream indicative of particular points on the touch sensor 120(2) that detect a touch.

The ALS may generate light sensor data 122. The light sensor data 122 may comprise information about the ambient lighting proximate to the HMWD 106. The light sensor data 122 may include intensity data and color data. Other sensors may provide other sensor data 122.

An audio control module 140 may comprise a volume module 142. The volume module 142 may accept as input sensor data 122 and determine output volume 144. The output volume 144 may comprise a value or other data that is representative of loudness of output from the AUs 112 during operation.

The user 102 may provide input to the HMWD 106 to set a desired output volume 144. For example, the user 102 may use a spoken command acquired by a microphone 120(1) such as, the user 102 saying "increase volume to 10". An automated speech recognition (ASR) system may be used to determine one or more instructions that correspond with the speech. In another example, the user 102 may use a touch sensor 120(2) to provide touch sensor data 122 that is used to determine the output volume 144.

In some implementations, the volume module 142 may use audio sensor data 122 to determine an ambient noise level. For example, the ambient noise level may be determined by periodically sampling the amplitude of signals represented by individual frames of audio sensor data 122. The sampling may be performed such that intelligible speech is not acquired during the sample. The volume module 142 may use the ambient noise level as input to determine the output volume 144. For example, as the ambient noise level increases, the output volume 144 increases as well. Continuing the example, as the ambient noise level decreases, the output volume 144 decreases as well.

In some implementations, the volume module 142 may use sensor data 122 from other sensors. For example, ambient light sensor data from the ALS may be used to determine an ambient light level. The volume module 142 may use the ambient light level as input to determine the output volume 144. For example, as the ambient light level increases, the output volume 144 increases as well. Continuing the example, as the ambient light level decreases, the output volume 144 decreases as well.

In some implementations, the volume module 142 may use data from other modules. For example, an operating system (OS) module may indicate that the HMWD 106 is in a quiet or "do not disturb" mode and the volume module 142 may set the output volume 144 to zero (mute).

The HMWD 106 may include an application module 126. The application module 126 may provide an application such as a telephony application to facilitate a realtime call (RTC), an audio player application to listen to music content such as music, audiobooks, or podcasts, and so forth. The application module 126, or other modules of the HMWD 106 may provide audio output data 128. The audio output data 128 may be provided to the audio control module 140. The audio output data 128 comprises digitized data that is representative of sound. For example, the audio output data 128 may comprise PCM data. In some implementations audio type data may be determined. The audio type data may be indicative of one or more categories that the associated audio output data 128 corresponds to. For example, the audio type data may be indicative of "phone", "entertainment", "alarm", and so forth. In some implementations, the audio type data may be included in the audio output data 128. In other implementations, other modules such as an operating system (OS) module, may provide the audio type data at a given time.

The audio control module 140 may include an equalizer module 146. The equalizer module 146 applies one or more equalization profiles 148 to the audio output data 128 to generate first frequency equalized audio output data 150 and second frequency equalized audio output data 152. The first frequency equalized audio output data 150 may comprise audio that includes a low frequency range, such as 20 Hertz (Hz) to 1,000 Hz, while the second frequency equalized audio output data 152 may consist of audio having frequencies of 1000 Hz to 20,000 Hz.

The equalization profiles 148 comprise data that specifies gain for one or more frequencies or frequency bands that are to be selectively amplified or attenuated. For example, the equalization profile 148 may be representative of a notch filter in which a specified range of frequencies that are within a specified range are attenuated by a specified number of decibels. An equalization profile 148 may include a first frequency band that is attenuated and a second frequency band that is amplified.

The use of an equalization profile 148 allows the resulting output from transducers within the AU 112 to be modified. These modifications may be done for various purposes. For example, the equalization profile 148 may be used to "flatten" the response of a particular type of transducer that otherwise exhibits a sharp resonance peak at a particular frequency. The result of the equalization may be to improve the quality of the sound when presented by the AU 112. In another example, a particular equalization profile 148 may be used to attenuate particular frequencies that may be more easily propagated to a bystander 110. In yet another example, a particular equalization profile 148 may be used to adjust for specific hearing loss of the user 102, accommodate a personal preference, and so forth.

In some implementations, a digital signal processor (DSP) or other device may compensate for phase changes resulting from operation of the equalizer module 146. For example, the compensation may ensure that a second phase of a second sound from the second transducer 184 is 180 degrees from a first phase of a first sound from the first transducer 182 at the position associated with the ear of the user 102.

The equalized audio output data is provided to acoustic unit control circuitry 160. The acoustic unit control circuitry 160 may comprise one or more digital to analog converters (DAC) 162 and amplifiers 164. The DAC 162 accepts the equalized audio output data and generates an analog signal. The analog signal may then be amplified by an amplifier 164 to generate a drive signal. In the implementation shown here, the equalizer module 146 processes the audio output data 128 to produce first frequency equalized audio output data 150 and second frequency equalized audio output data 152. The first frequency equalized audio output data 150 is provided as input to a first DAC 162(1) that generates a first analog signal. This first analog signal is provided as input to a first amplifier 164(1) that provides as output a first drive signal 170. For example, the first drive signal 170 may comprise an analog signal having low frequencies in a range of 20 Hz to 1,000 Hz. The second frequency equalized audio output data 152 is provided as input to a second DAC 162(2) that generates a second analog signal. This second analog signal is provided as input to a second amplifier 164(2) that provides as output a second drive signal 172. The second drive signal 172 may comprise an analog signal having high frequencies in a range of greater than 1,000 Hz.

In other implementations, other techniques may be used. For example, one or more filters may be used to provide a first portion of a signal that is below a threshold value to the first transducer 182 and a second portion of the signal that is greater than the threshold value to the second transducer 184.

The AU 112 comprises a first transducer 182 and a second transducer 184. The transducers are configured to produce acoustic or audio output. For example, the transducer displaces a diaphragm to cause sound waves comprising compression and rarefaction in air. The transducers may include, but are not limited to, electromagnets such as voice coils, piezoelectric devices, metallic ribbon devices, magnetostrictive devices, electrostatic devices, microelectromechanical systems (MEMS), and so forth. A transducer may comprise, or be affixed to, a diaphragm that is moved by a driver, such as an electromagnet, to produce vibrations in the air, and thus sound. The sound on a first side of the diaphragm exhibits a first phase while the sound on the second side of the diaphragm exhibits a second phase that is 180 degrees different from the first phase. For example, when the diaphragm moves to the left it creates a compression wave (wave front of greater density) in the air and simultaneously to the right of the diaphragm it creates a rarefaction (area of lesser density) wave.

Various types of speakers, receivers, or other sound producing devices may be used as transducers. For example, the transducer may comprise a speaker such as the 1216CS99 from Shenzhen Sunway Communication Co., Ltd of China. In another example, the first transducer 182 may comprise a 10*7*2.5 RCV from Goertek, Inc. of China while the second transducer 184 may comprise a 16*12*2.5 Super Balance SPK from Goertek, Inc.

The first transducer 182 and the second transducer 184 may be of the same type, or may differ from one another in construction or operating characteristics. In one implementation, the first transducer 182 may be designed to generate low frequency sounds while the second transducer is designated to generate high frequency sounds. A threshold frequency specifies a boundary between a low frequency range and a high frequency range. In some implementations, the frequency ranges of the output of the first transducer 182 and the second transducer 184 may overlap. For example, the first transducer 182 may be used to generate sound from 20 Hz to 20,000 Hz while the second transducer 184 is used to generate sound from 1,200 Hz to 20,000 Hz. The diaphragm of the transducers may vary. For example, the first transducer 182 may have a first diaphragm with a first width that is greater than a second width of a second diaphragm of the second transducer 184. In another example, the composition of the diaphragms may vary.

The first drive signal 170 is provided to the first transducer 182, operating the first transducer 182. During operation at low frequencies, the first transducer 182 generates sound. At least in part due to the physical configuration of the AU 112, at low frequencies the AU 112 radiates as an acoustic monopole. This produces an approximately omnidirectional acoustic pattern of sound pressure level (SPL), as illustrated by the first acoustic pattern 116. An acoustic pattern may be expressed as a region having a surface upon which a predetermined SPL value is measured. The ear of the user 102 is physically close to the AU 112, and so the user 102 is able to hear the acoustic output.

The ambient environment is filled with predominately low frequency ambient noise. As a result, the ambient noise masks the low frequency audio output from the AU 112. This masking prevents bystanders 110 from being annoyed by, or eavesdropping on, the audio output. Additionally, due to the nature of human hearing, perceived loudness by the user 102 is substantially affected by the SPL of low and mid frequency sounds. By using the first transducer 182 in the AU 112 as an acoustic monopole for low frequencies, the overall perceived loudness of the entire audio output produced by the AU 112 is increased. This increase in perceived loudness allows for an actual reduction in the amplitude of the drive signals, relative to a device that omits the low frequencies.

High frequency sounds tend to be more readily perceived at a distance by bystanders 110. The second drive signal 172 is provided to the second transducer 184, operating the second transducer 184. During operation at high frequencies, the second transducer 184 generates sound. At least in part due to the physical configuration of the AU 112, at high frequencies the AU 112 radiates as an acoustic quadrupole. In the implementation depicted here, the AU 112 operates as a longitudinal acoustic quadrupole, producing an SPL characterized by a pair of opposing regions arranged in a "dumbbell" or "figure eight" configuration, as illustrated by the second acoustic pattern 118. For example, a first region of the second acoustic pattern 118 may extend from one side of the AU 112 and a second region may extend from an opposite side of the AU 112. The regions may be aligned along a major axis extending through a long axis of each of the regions. The second acoustic pattern 118 may be approximately symmetrical.

An asymmetric implementation of the first acoustic pattern 116 may be produced by adjusting the relative phase difference between a first signal used to operate the first transducer 182 and a second signal used to operate the second transducer 184 in the AU 112. For example, a hypercardioid pattern could be produced that results in the asymmetric first acoustic pattern 116 directing sound towards the ear of the user 102 while reducing sound in the opposite direction. In both cases, the major axis of the second acoustic pattern 118 may be aligned to extend upwards and away from where the ear of the user 102 is expected to be while the HMWD 106 is being worn. For example, the ear of the user 102 is within a lower region while the upper region extends upwards and away from the head 104.

The acoustic unit 112 includes a plurality of ports that direct sound generated by the first transducer 182 and the second transducer 184 into the surrounding environment. The first acoustic pattern 116 and the second acoustic pattern 118 are determined based at least in part on the relative arrangement of these ports with respect to one another. The acoustic unit 112 is discussed in more detail with regard to FIG. 6.

In addition to one or more AUs 112, the HMWD 106 may include other output devices 180. For example, the HMWD 106 may include a visual indicator device (VID), haptic output devices, and so forth.

The HMWD 106 may also include a communication module 190. The communication module 190 may be configured to establish communication with other devices. The communication module 190 may use one or more communication interfaces to establish communication with the other devices via one or more networks. For example, the network may comprise a personal area network, local area network, metropolitan area network, wide area network, and so forth. The HMWD 106 may use the networks to access one or more services that are provided by the other devices. For example, the HMWD 106 may establish communication with one or more servers. These one or more servers may provide one or more services, such as automated speech recognition, information retrieval, communication with other users, providing a telephone call, retrieving audio output data 128 for presentation, and so forth.

While the HMWD 106 is described in the form factor of eyeglasses, the HMWD 106 may be implemented in other form factors. For example, the HMWD 106 may comprise a device that is worn behind an ear of the user 102, on a headband, as a necklace, on the shoulders, as jewelry, and so forth. In some implementations, the HMWD 106 may be deployed as a system, comprising several physically separate devices that operate in conjunction with one another. In other implementations other form factors may be used. For example, the AUs 112 and audio control module 140 may be installed within a vehicle.

Figure 2:
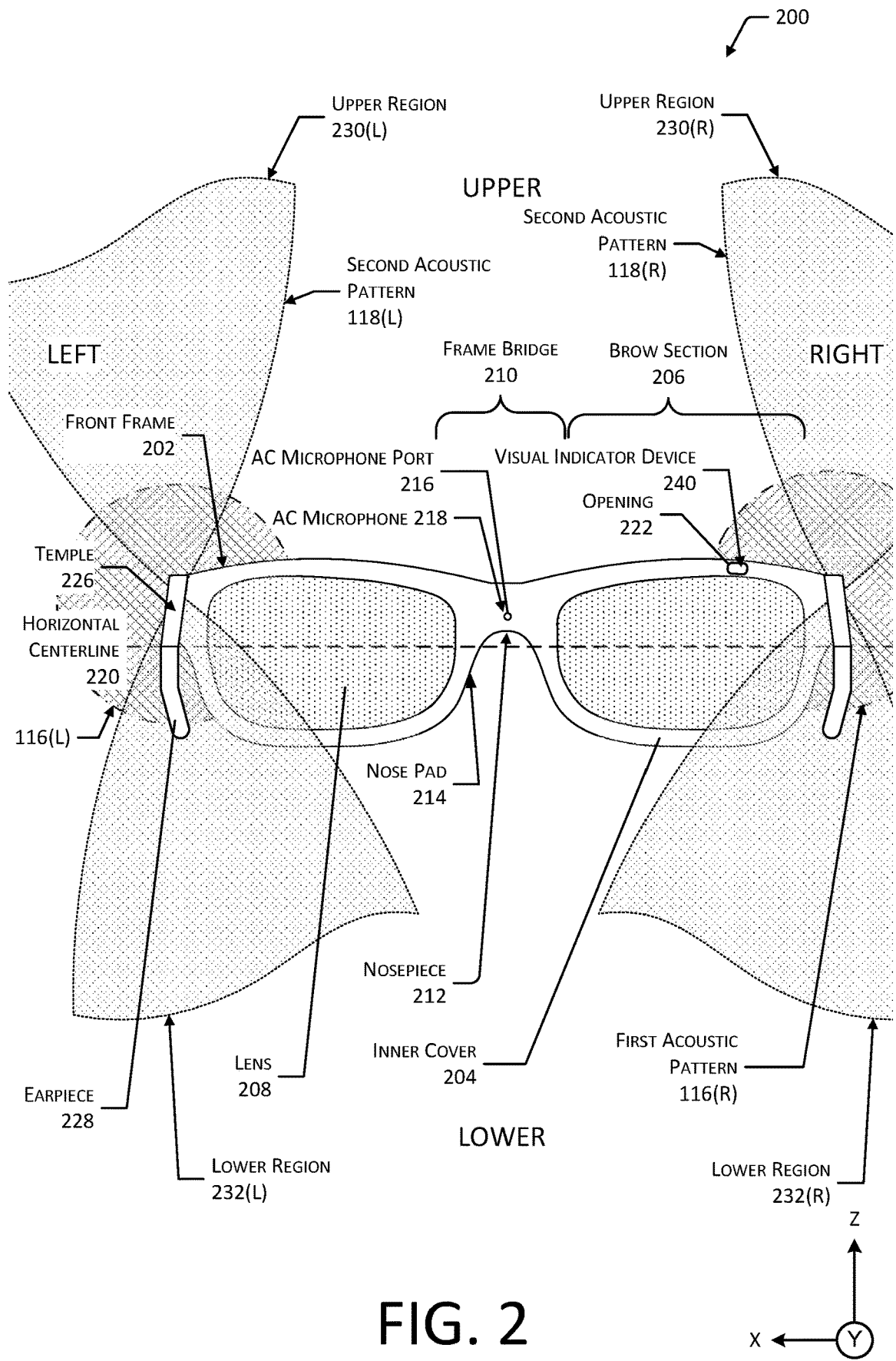
FIG. 2 depicts a view of a head-mounted wearable device, according to some implementations.

FIG. 2 depicts a view 200 of an HMWD 106, according to some implementations. This view is from the point of view of a user 102 just prior to donning the HMWD 106.

The HMWD 106 comprises a front frame 202. The front frame 202 may comprise cavities or spaces for various devices. An inner cover 204 is arranged on an interior side of the front frame 202 and closes or conceals those cavities or spaces. The inner cover 204 may be affixed to the front frame 202 by way of mechanical interference fit, fasteners, adhesives, and so forth.

The front frame 202 may include a left brow section 206(L) and a right brow section 206(R). Each brow section 206 may include a lens 208. A frame bridge 210 joins the left brow section 206(L) and the right brow section 206(R).

In some implementations, the front frame 202 may comprise a single piece of material, such as a metal, plastic, ceramic, composite material, and so forth. For example, the front frame 202 may comprise 6061 aluminum alloy that has been milled to the desired shape and to provide space for devices within. In another example, the front frame 202 may comprise injection molded plastic. In other implementations, the front frame 202 may comprise several discrete pieces that are joined together by way of mechanical engagement features, welding, adhesive, and so forth.

The lenses 208 may have specific refractive characteristics, such as in the case of prescription lenses. The lenses 208 may be clear, tinted, photochromic, electrochromic, and so forth. For example, the lenses 208 may comprise plano (non-prescription) tinted lenses to provide protection from the sun. In some implementations, only a single lens 208 may be installed, or the lenses 208 may be omitted.

A nosepiece 212 may be affixed to the frame bridge 210. One or more nose pads 214 may be integral with, or affixed to, the nosepiece 212. The nose pads 214 aid in the support of the front frame 202 and may improve comfort of the user 102.

The inner cover 204 at the frame bridge 210 may include an air conduction microphone (ACM) port 216. The ACM port 216 may comprise a passageway or hole through the inner cover 204 that allows sound vibrations to be conveyed to an ACM 218 located within the frame bridge 210.

Depicted is a horizontal centerline 220. The horizontal centerline 220 may extend through the optical centers of the lenses 208. For example, the horizontal centerline 220 may extend from left to right. In other implementations the centerline may be referenced to other points or features. For example, instead of an optical center, the centerline may be aligned to a geometric center of the lens 208.

The inner cover 204 includes one or more openings 222 to provide for visibility of the visual indicator device (VID). The opening 222 may provide a passage through which illumination produced by the visual indicator device may pass.

In some implementations, instead of or in addition to an opening 222, the inner cover 204 may be translucent, transparent, or include a window through which the light from the visual indicator device is visible to the user 102. For example, the inner cover 204 may comprise translucent plastic that transmits at least a portion of the light emitted by a light of the visual indicator device.

The opening 222 may be placed in an upper right quadrant of the right brow section 206(R), such as shown here. This places the light from the visual indicator device within the field of view of the user 102. The opening 222 may be positioned at other locations on the inner cover 204, such as proximate to the temple 226. In other implementations, additional openings 222 may be present, additional visual indicator devices may be present, and so forth.

An earpiece 228 may extend from a portion of the temple 226 that is distal to the front frame 202. The earpiece 228 may comprise a material that may be reshaped to accommodate the anatomy of the head 104 of the user 102. For example, the earpiece 228 may comprise a thermoplastic that may be warmed to a predetermined temperature and reshaped. In another example, the earpiece 228 may comprise a wire that may be bent to fit. The wire may be encased in an elastomeric material.

The HMWD 106 may include one or more AUs 112. In this illustration, an AU 112 (not shown) is positioned in each of the temples 226. At low frequencies, the AU 112 operates as an acoustic monopole and produces the first acoustic pattern 116.

At high frequencies, the AU 112 operates as an acoustic quadrupole and produces the second acoustic pattern 118. The second acoustic pattern 118 comprises an upper region 230 and a lower region 232. The upper region 230 has a first sound amplitude while the lower region 232 has a second sound amplitude. In some implementations the first sound amplitude and the second sound amplitude may be the same. The lower region 232 is directed such that it encompasses at least a portion of the ear of the user 102. For example, the lower region 232(L) for the left AU 112(L) may encompass a portion of the pinna. The upper region 230 extends upwards and away from the temple 226 and the head 104 of the user 102. The second acoustic pattern 118 includes an acoustically null region between the upper region 230 and the lower region 232, and exhibits a third sound amplitude that is less than the first sound amplitude and the second sound amplitude.

Figure 3:
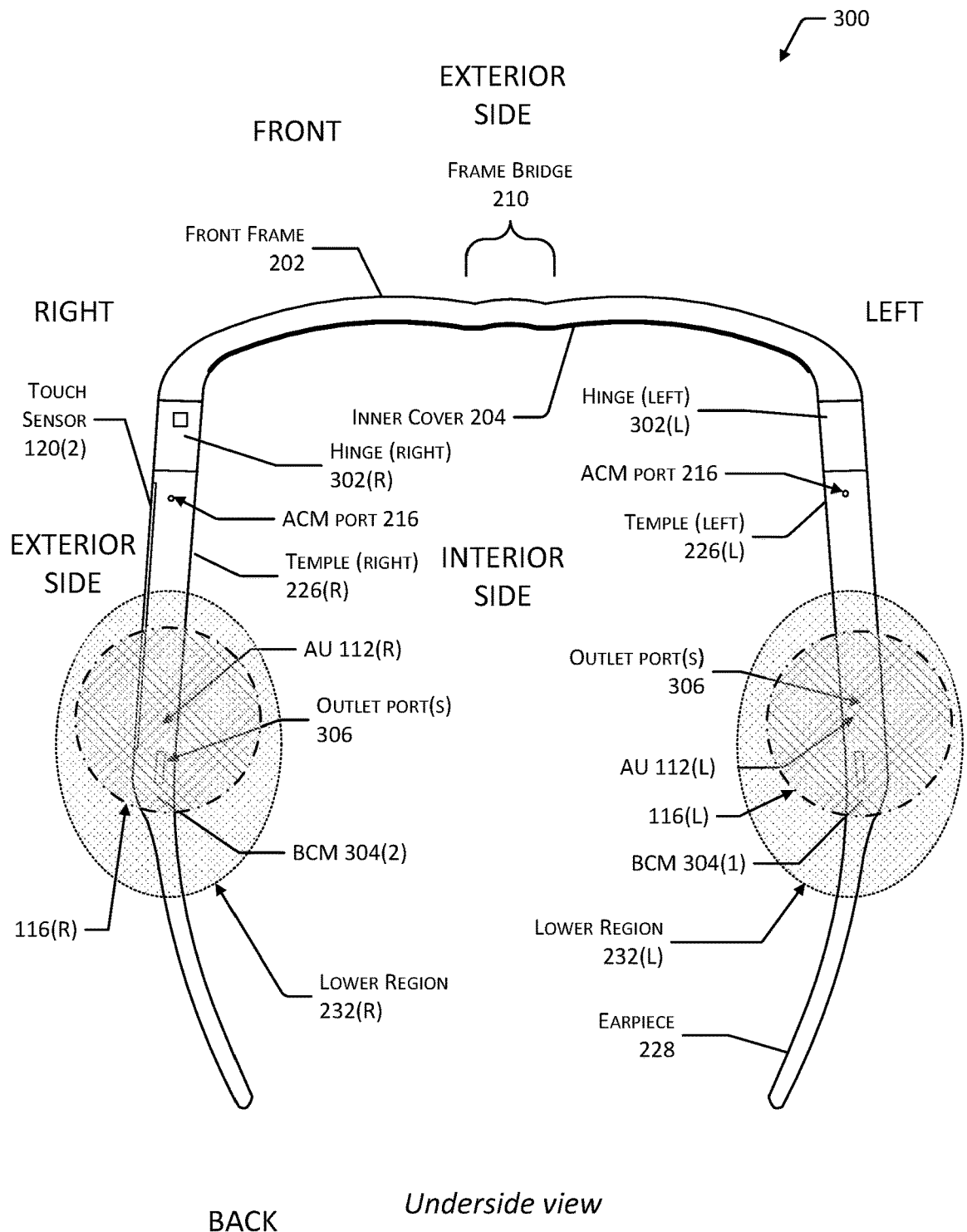
FIG. 3 depicts an exterior view, from below, of the head-mounted wearable device in an unfolded configuration, according to some implementations.

FIG. 3 depicts an exterior view 300, from below, of an underside of the HMWD 106 in an unfolded configuration, according to some implementations. In this view, the front frame 202 is visible along with the inner cover 204.

One or more hinges 302 may be affixed to, or an integral part of, the front frame 202. Depicted are a left hinge 302(L) and a right hinge 302(R) on the left and right sides of the front frame 202, respectively. The left hinge 302(L) is arranged at the left brow section 206(L), distal to the frame bridge 210. The right hinge 302(R) is arranged at the right brow section 206(R) distal to the frame bridge 210.

The temple 226 may couple to a portion of the hinge 302. For example, the temple 226 may comprise one or more components, such as a knuckle, that mechanically engage one or more corresponding structures on the hinge 302.

The left temple 226(L) is attached to the left hinge 302(L) of the front frame 202. The right temple 226(R) is attached to the right hinge 302(R) of the front frame 202.

The hinge 302 permits rotation of the temple 226 with respect to the hinge 302 about an axis of rotation. The hinge 302 may be configured to provide a desired angle of rotation. For example, the hinge 302 may allow for a rotation of between 0 and 120 degrees. As a result of this rotation, the HMWD 106 may be placed into a folded configuration. For example, each of the hinges 302 may rotate by about 90 degrees inward with the temples 226 moving toward the front frame 202.

One or more of the front frame 202, the hinge 302, or the temple 226 may be configured to dampen the transfer of vibrations between the front frame 202 and the temples 226. For example, the hinge 302 may incorporate vibration damping structures or materials to attenuate the propagation of vibrations between the front frame 202 and the temples 226. These vibration damping structures may include elastomeric materials, springs, and so forth. In another example, the portion of the temple 226 that connects to the hinge 302 may comprise an elastomeric material.

One or more different sensors or other input devices 120 may be placed on the HMWD 106. For example, the touch sensor 120(2) may be arranged along an exterior surface of the right temple 226(R). In another example, a first ACM 218(1) may be located at the frame bridge 210, while a second ACM 218(2) is located in the left temple 226(L), a third ACM 218(3) is located in the right temple 226(R), and so forth. In another example, an ACM 218(4) may be located within or proximate to the left hinge 302(L), such as on the underside of the left hinge 302(L). The ACMs 218 (not shown) may have corresponding ACM ports 216. For example, the ACM 218 may have an ACM port 216 that provides a passageway between the exterior environment and the ACM 218.

The ACM 218 may comprise a diaphragm, MEMS element, or other elements that move in response to the displacement of air by sound waves. Data produced by the ACM 218 may be generated that is indicative of the sound detected by the ACM 218. For example, the audio sensor data 122 may be generated based on input from one or more ACMs 218. In some implementations, beamforming techniques may be used to process output from a plurality of ACMs 218. For example, a digital signal processor may apply a beamforming algorithm to the output from the second ACM 218(2) and the third ACM 218(3) to provide gain in the direction of where the mouth of the head 104 is expected to be while the HMWD 106 is donned.

The HMWD 106 may include one or more BCMs 304. The BCM 304 is responsive to the vibrations produced by the user 102, such as while speaking. For example, the BCM 304 may comprise an accelerometer, gyroscope, vibration sensor, and so forth that detects the vibrations in the head 104 of the user 102 that result from utterances of the user 102. In some implementations, output from the one or more BCMs 304 may be used to determine if the user 102 is speaking.

The BCM 304 may be arranged to be in contact with the skin above a bony or cartilaginous structure. For example, where the HMWD 106 is in the form of eyeglasses, nose pads 214 of a nosepiece 212 may be mechanically coupled to the BCM 304 such that vibrations of the nasal bone, glabella, or other structures upon which the nose pads 214 may rest are transmitted to the BCM 304. In other implementations, the BCM 304 may be located elsewhere with respect to the HMWD 106, or worn elsewhere by the user 102. For example, the BCM 304 may be incorporated into the temple 226 of the HMWD 106, a hat, or headband.

The HMWD 106 may include one or more AUs 112. For example, a first AU 112(L) is located in the left temple 226(L) and a second AU 112(R) is located in the right temple 226(R). Each AU 112 may comprise at least a pair of transducers.

The AU 112 may have one or more outlet ports 306 that allow sound to be transferred from the AU 112 to the surrounding environment. The outlet port 306 may comprise one or more holes that provide a passageway or hole through an exterior housing or enclosure to the exterior environment. In some implementations, the outlet port 306 may be covered or filled with a grill, mesh, fabric, elastomeric material, and so forth. The outlet ports 306 may have the same size and shape, or may have different sizes and shapes.

In this illustration, a portion of the lower regions 232 for each of the respective AUs 112 are shown. For example, a portion of the first acoustic pattern 116 and the second acoustic pattern 118, corresponding to each of the AUs 112 is shown.

The various ports associated with the HMWD 106 may be placed at different locations, have different shapes, sizes, and so forth. For example, multiple ACM ports 216 may be present on an underside of one or more temples 226. In another example, the ACM ports 216 or the outlet ports 306 may be rectangular rather than circular.

One or more buttons may be placed in other locations on the HMWD 106. For example, a button may be emplaced within, or proximate to, the right hinge 302(R), such as on an underside of the right hinge 302(R).

One or more components of the HMWD 106 may comprise single unitary pieces or may comprise several discrete pieces. For example, the front frame 202 and the nosepiece 212 may comprise a single piece, or may be constructed from several pieces joined or otherwise assembled.

Figure 4:
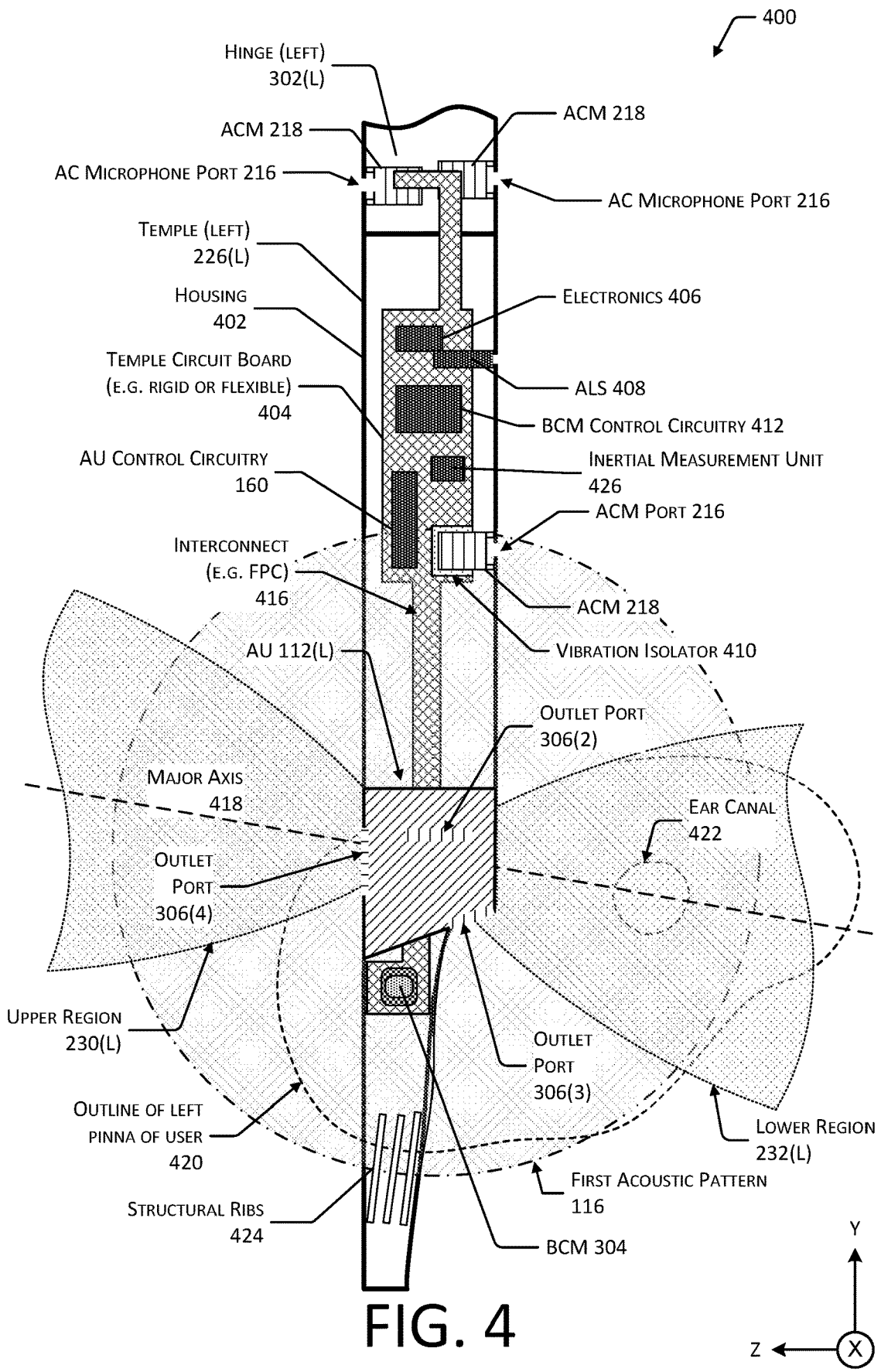
FIG. 4 depicts a view of some of the internal components of a temple of a head-mounted wearable device, according to some implementations.

FIG. 4 depicts a view 400 of some of the internal components of a left temple 226(L) of a HMWD 106, according to some implementations. The depiction of the left temple 226(L) is provided by way of example and not necessarily as a limitation. For example, the same or similar structures as described herein may be installed in the right temple 226(R).

A portion of the hinge 302 is depicted. Arranged within the hinge 302 is an ACM 218. An ACM port 216 for the ACM 218 in the hinge 302 is depicted. The ACM port 216 may open generally downwards. For example, the aperture of the ACM port 216 may be on a bottom surface of the hinge 302 and may open towards the feet of the user 102 during normal wear.

As described above, the hinge 302 is coupled to a temple 226. The temple 226 may comprise a housing 402. The housing 402 may comprise one or more elements that serve to enclose at least a portion of the temple 226. The housing 402 may comprise a plastic, metal, ceramic, composite material, and so forth.

A temple circuit board 404 is depicted. The temple circuit board 404 may comprise a rigid or flexible circuit board. For example, the temple circuit board 404 may comprise a flexible printed circuit. In some implementations, the temple circuit board 404 may extend at least partially into the hinge 302. For example, the ACM 218 may be connected to the temple circuit board 404.

Electronics 406 may be connected to, affixed to, or otherwise in communication with the temple circuit board 404. For example, integrated circuits may be laminated to the temple circuit board 404. For example, an ALS 408 may be mounted to the temple circuit board 404. A hole or window in the housing 402 may allow the sensors in the ALS 408 to detect ambient light. The window may be located on the underside as shown here, or on any other side of the temple 226. In other implementations the ALS 408 may be located elsewhere on the HMWD 106. For example, the ALS 408 may be located in the front frame 202. In another example, the ALS 408 may be mounted such that the hole or window is on an exterior surface of the temple 226, such as on a side of the temple 226 that is opposite the head 104 of the user 102.

The HMWD 106 may include one or more inertial measurement units (IMU) 426. For example, an IMU 426 may be affixed to the temple circuit board 404. The IMU 426 may comprise one or more accelerometers or gyroscopes. For example, the IMU 426 may comprise a microelectromechanical system comprising three linear accelerometers measuring acceleration with respect to three orthogonal axes, three gyroscopes or gyrometers to measure rotation with respect to the three orthogonal axes, and so forth.

In some implementations, a vibration isolator 410 may be used to provide some attenuation of mechanical vibration between the temple circuit board 404 and the ACM 218. For example, the vibration isolator 410 may comprise an elastomeric material such as a viscoelastic foam, acoustic foam, and so forth. In another example, the vibration isolator 410 may comprise a flexible member such as a living hinge, pleated material, flexible printed circuit board, and so forth. By attenuating the transfer of the mechanical vibration from the AU 112 to the ACM 218, the input to the ACM 218 may include less noise.

The electronics 406 may include BCM control circuitry 412 that is configured to acquire data from the BCM 304 and produce audio sensor data 122. The electronics 406 may include the AU control circuitry 160 to generate one or more drive signals. For example, the application module 126 may provide the audio output data 128 to the AU control circuitry 160.

An interconnect 416 may be used to connect the temple circuit board 404 to one or more of the AU 112, the BCM 304, and so forth. The interconnect 416 may comprise a flexible printed circuit, wiring harness, and so forth to provide an electrical connection. In some implementations, the interconnect 416 may comprise an extension of the temple circuit board 404.

The AU 112 may be connected to, or may include, one or more outlet ports 306. The outlet ports 306 may be located at one or more locations on the temple 226, such as described below. During operation, the first acoustic pattern 116 and the second acoustic pattern 118 are produced as described above. The second acoustic pattern 118 includes a major axis 418. The major axis 418 may comprise a line that extends along a long axis of each of the upper region 230 and the lower region 232.

Also depicted is an approximate location of an outline of a pinna 420 of the left ear of the user 102 when the HMWD 106 is being worn. Also shown is an approximate location of an ear canal 422 of the user's 102 left ear. As shown here, the major axis 418 of the second acoustic pattern 118 is arranged such that the ear canal 422 is within the lower region 232. For example, as depicted here, the lower edge of the major axis 418 may pass through the ear canal 422. In other implementations, the major axis 418 may be arranged at other angles.

While the AU 112 is depicted as being within the housing 402 of the temple 226, in other implementations the AU 112 or portions thereof may be outside of the housing 402.

Depicted in this illustration are structural ribs 424. The structural ribs 424 may be used to add rigidity to a distal portion of the temple 226. The structural ribs 424 may also improve structural support for the earpiece 228 (not shown).

Figure 5:
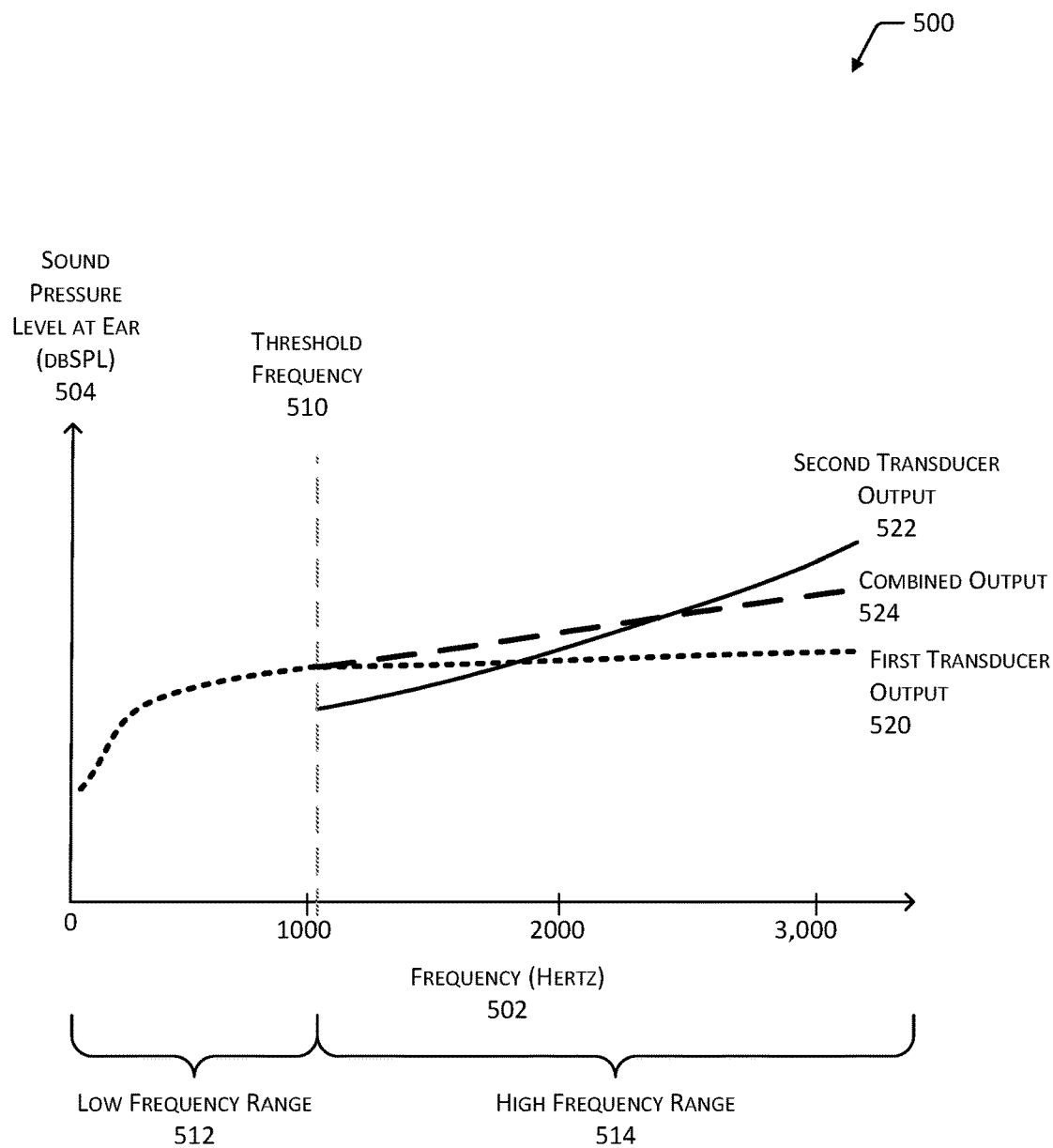
FIG. 5 shows a graph of sound pressure for sound produced by the first transducer and the second transducer, according to some implementations.

FIG. 5 shows a graph 500 of sound pressure for sound produced by the first transducer 182 and the second transducer 184, according to some implementations. In this graph, frequency 502 is depicted along a horizontal axis while a vertical axis indicates a sound pressure level (SPL) (in decibels) 504 as measured at the ear of the user 102 while the HMWD 106 is being worn. A threshold frequency 510 is shown that specifies an upper bound of a low frequency range 512 and a lower bound of a high frequency range 514.

First transducer output 520 produced by operation of the first transducer 182 in the AU 112 is shown. Also shown is second transducer output 522 produced by operation of the second transducer 184 in the AU 112. In this illustration, the first transducer output 520 provides a generally flat response over most of the low frequency range 512 and the high frequency range 514. In comparison, the second transducer output 522 shows an increasing SPL at ear 504 that begins at the threshold frequency 510 and increases with frequency 502. A combined output 524 is also shown, comprising the combined effect of the first transducer output 520 and the second transducer output 522.

During operation, a transducer may be used to produce sound across at least a portion of the low frequency range 512 as well as the high frequency range 514. For example, the first transducer 182 may be used to provide sound from approximately 200 Hz to 20,000 Hz. In comparison, the second transducer 184 may be used to provide sound from approximately 1,100 Hz to 20,000 Hz.

Figure 6:
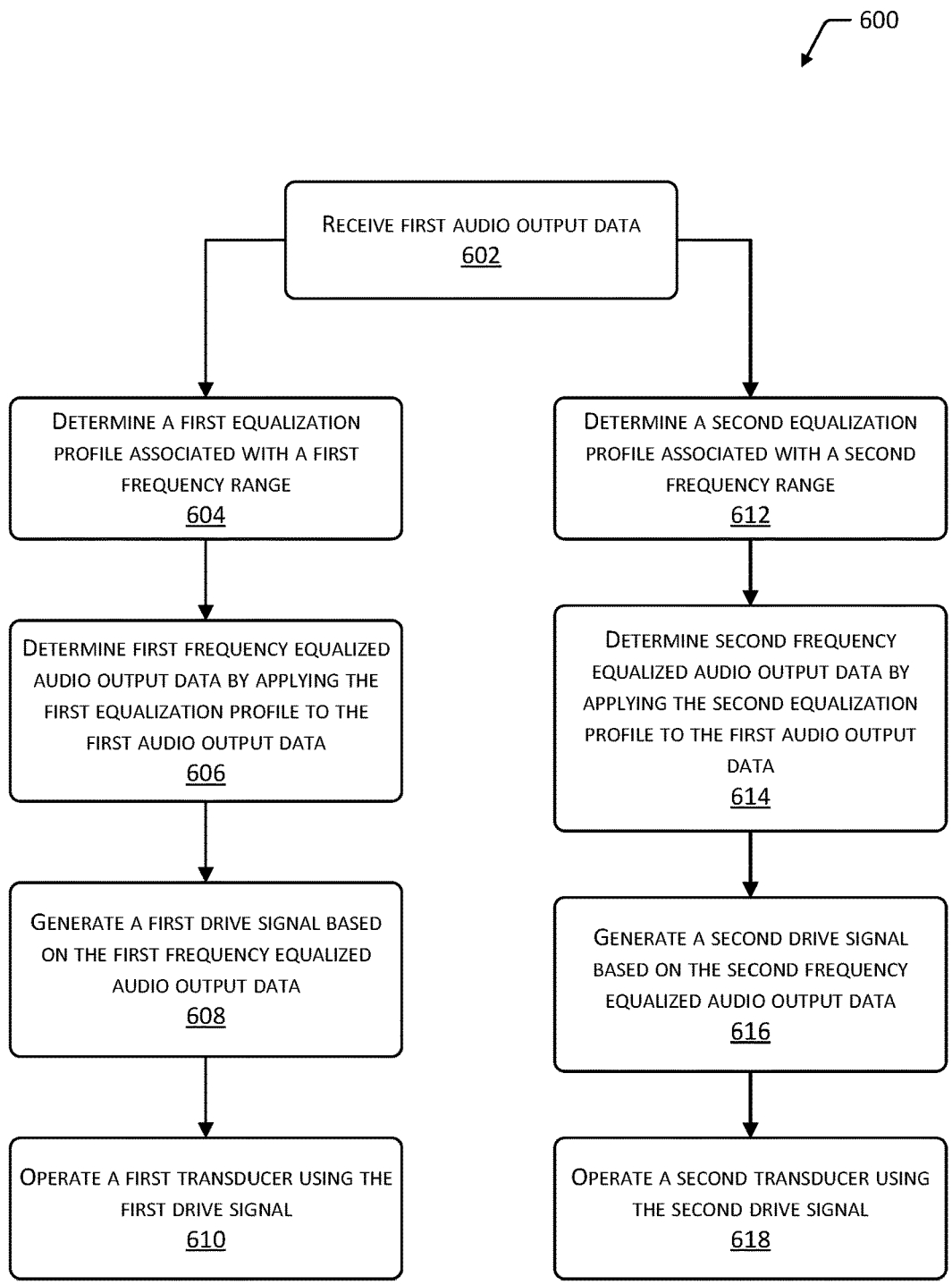
FIG. 6 is a flow diagram of a process to operate transducers in an acoustic unit to minimize sound leakage into a surrounding environment, according to another implementation.

FIG. 6 is a flow diagram 600 of a process to operate transducers in an acoustic unit 112 to minimize sound leakage into a surrounding environment, according to another implementation. The process may be implemented at least in part by one or more of the application module 126, the audio control module 140, the acoustic unit control circuitry 160, or other devices.

At 602 first audio output data 128 is received. For example, the application module 126 may send the audio output data 128 to the audio control module 140.

At 604 a first equalization profile 148(1) that is associated with a first frequency range is determined. For example, the equalizer module 146 may retrieve an equalization profile 148 from memory. In some implementations, the equalization profile 148 may be determined based at least in part on sensor data 122. For example, ambient noise level as determined from the microphones 120(1), user input from the touch sensor 120(2), and so forth may be used to select a particular equalization profile 148 from a plurality of equalization profiles 148. In some implementations, the equalization profile 148 may be determined based at least in part on the audio type data. For example, a particular equalization profile 148 may be associated with a particular audio type and frequency range.

At 606 first frequency equalized audio output data 150 is determined by applying the first equalization profile 148(1) to the first audio output data 128. For example, the equalizer module 146 may increase or decrease the amplitude values for sample values associated with particular frequencies to determine the first frequency equalized audio output data 150.

At 608 a first drive signal 170 is generated based on the first frequency equalized audio output data 150. For example, the first frequency equalized audio output data 150 may be provided as input to a first DAC 162(1) that generates a first analog signal as output. The first analog signal is provided as input to a first amplifier 164(1) which generates the first drive signal 170.

At 610 the first transducer 182 is operated using the first drive signal 170. For example, an electromagnet in the first transducer 182 moves a diaphragm responsive to the first drive signal 170.

At 612 a second equalization profile 148(2) that is associated with a second frequency range is determined. For example, the equalizer module 146 may retrieve an equalization profile 148 from memory. In some implementations, the equalization profile 148 may be determined based at least in part on sensor data 122. For example, ambient noise level as determined from the microphones 120(1), user input from the touch sensor 120(2), and so forth may be used to select a particular equalization profile 148 from a plurality of equalization profiles 148. In some implementations, the equalization profile 148 may be determined based at least in part on the audio type data. For example, a particular equalization profile 148 may be associated with a particular audio type and frequency range.

At 614 second frequency equalized audio output data 152 is determined by applying the second equalization profile 148(2) to the first audio output data 128. For example, the equalizer module 146 may increase or decrease the amplitude values for sample values associated with particular frequencies to determine the second frequency equalized audio output data 152.

At 616 a second drive signal 172 is generated based on the second frequency equalized audio output data 152. For example, the second frequency equalized audio output data 152 may be provided as input to a second DAC 162(2) that generates a second analog signal as output. The second analog signal is provided as input to a second amplifier 164(2) which generates the second drive signal 172.

At 618 the second transducer 184 is operated using the second drive signal 172. For example, an electromagnet in the second transducer 184 moves a diaphragm responsive to the second drive signal 172.

The operations described with respect to 604-610 may occur during or at the same time as the operations described with respect to 612-618.

Figure 7:
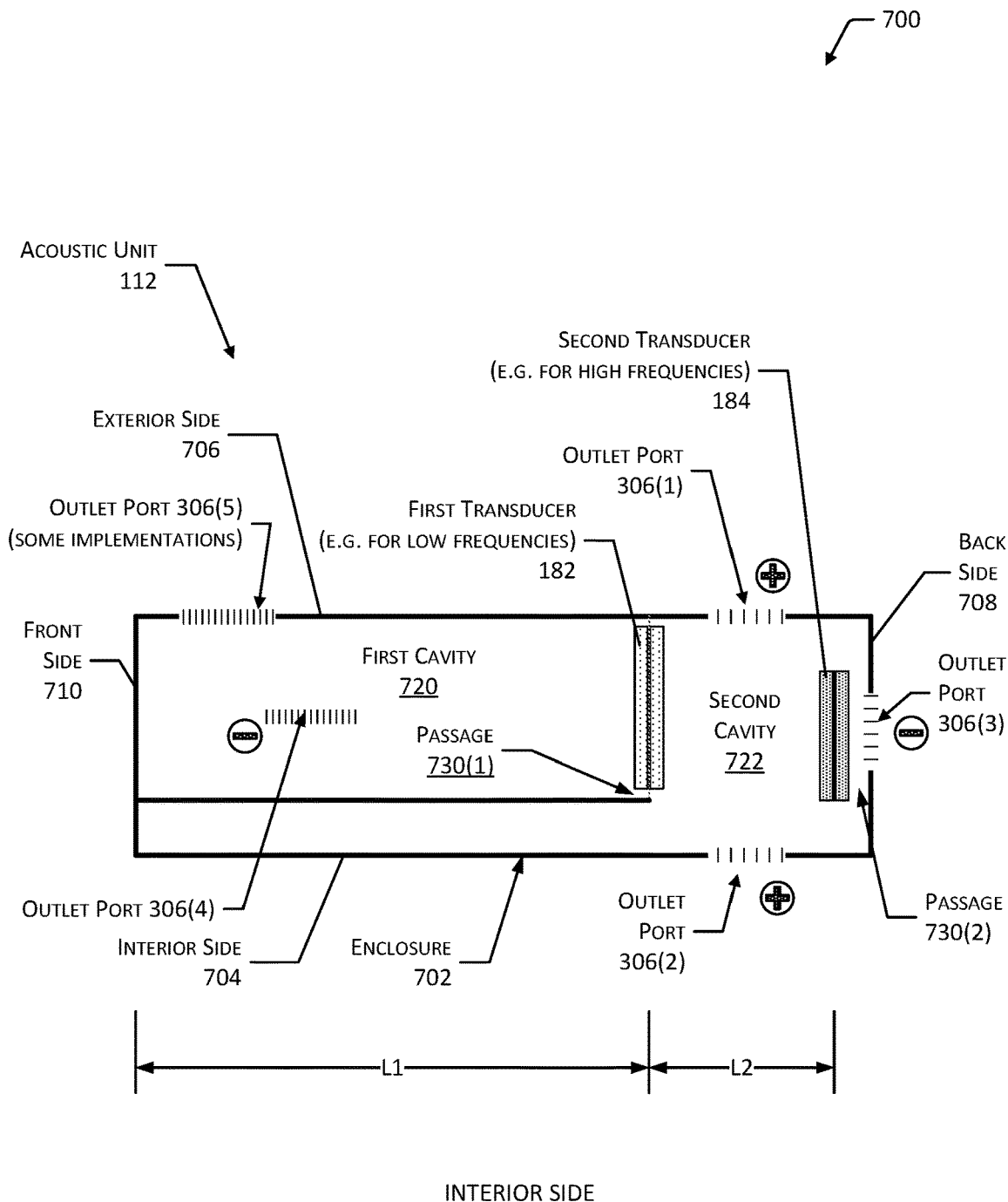
FIG. 7 is a diagram of an acoustic unit that operates as an acoustic monopole at low frequencies and an acoustic quadrupole at high frequencies, according to some implementations.

FIG. 7 is a diagram 700 of an acoustic unit 112, according to some implementations, that operates as an acoustic monopole at low frequencies and an acoustic quadrupole at high frequencies. The acoustic unit 112 comprises an enclosure 702. The enclosure 702 may be mounted to a temple 226, may be within the temple 226, or may be incorporated into the temple 226.

The enclosure 702 may comprise an interior side 704, exterior side 706, back side 708, upper side (not shown here), front side 710, and a lower side (not shown here). The interior side 704 is opposite the exterior side 706. The back side 708 is opposite the front side 710. The upper side is opposite the lower side.

A first cavity 720 and a second cavity 722 are within the enclosure 702. In the implementation depicted, the first cavity 720 is rectangular in this view, while the second cavity 722 exhibits an "L" shape with the long portion of the "L" extending along the first cavity 720.

A first outlet port 306(1) is present in the exterior side 706 of the second cavity 722. For example, the first outlet port 306(1) provides a first passageway between the second cavity 722 and the surrounding environment. A second outlet port 306(2) is present in the interior side 704 of the second cavity 722. For example, the second outlet port 306(2) provides a second passageway between the second cavity 722 and the surrounding environment. A third outlet port 306(3) is present in the back side 708 of the second cavity 722. For example, the third outlet port 306(3) provides a third passageway between the second cavity 722 and the surrounding environment. A fourth outlet port 306(4) is present in the upper side of the first cavity 720. For example, the fourth outlet port 306(4) provides a fourth passageway between the first cavity 720 and the surrounding environment.

For illustration, and not necessarily as a limitation, example phase of a sound wave at a given time as emitted from the outlet ports 306 is depicted. For example, a "+" indicates a compression while a "−" indicates a rarefaction. During operation at frequencies in the high frequency range 514, the relative arrangement of the outlet ports 306 operates as an acoustic quadrupole. In particular, the resulting phase operates as a longitudinal acoustic quadrupole, creating the second acoustic pattern 118.

In some implementations, a fifth outlet port 306(5) is also present in one of the exterior sides of the first cavity 720. For example, the fifth outlet port 306(5) may be in the exterior side 706. The fifth outlet port 306(5) provides a fifth passageway between the first cavity 720 and the surrounding environment. The fifth outlet port 306(5) may be used in implementations where the second cavity 722 provides a sufficiently long acoustic channel to increase low frequency response. For example, the fifth outlet port 306(5) may be used when the second cavity 722 is either extended or is coupled to a duct. In implementations where the volumetric constraints of the device dictate or acoustic considerations permit, the fifth outlet port 306(5) may be omitted.

One or more of the outlet ports 306 may be covered by, or otherwise include, an acoustic mesh. The acoustic mesh may be used to introduce a particular acoustic impedance. The acoustic impedance may be characterized as an opposition that a material, such as the acoustic mesh, presents to acoustic flow resulting from an acoustic pressure applied to the system. The acoustic impedance may be measured in units of pascal seconds per cubic meter. For example, the 26HY mesh available from Saati S.p.A. of Italy provides a relatively low acoustic impedance. In another example, the 160HY mesh available from Saati S.p.A. may provide a relatively large acoustic impedance.

The acoustic mesh may also prevent contaminants from entering the enclosure 702. For example, the acoustic mesh may prevent dirt, water, and so forth from entering the first cavity 720 and the second cavity 722. In some implementations, the acoustic impedance of the acoustic mesh used on different outlet ports 306 may differ. For example, the acoustic impedance of the acoustic mesh used on the fourth outlet port 306(4) may be greater than the acoustic impedance of the acoustic mesh used on the other outlet ports 306. In another example, the acoustic mesh of the fifth outlet port 306(5) may provide an acoustic impedance such that the fifth outlet port 306(5) acts as a high pass filter.

The first cavity 720 and the second cavity 722 are separated by the first transducer 182. In one implementation, the first transducer 182 may comprise a first diaphragm having a first side and a second side. A first driver comprising an electromagnet, may move the first diaphragm during operation to generate sound. For example, the electromagnet may be affixed to the diaphragm while a permanent magnet is affixed to a frame of the transducer. An electrical signal provided to the electromagnet creates a variable magnetic field that moves the electromagnet relative to the permanent magnet. The movement of the electromagnet displaces the diaphragm. The diaphragm in turn displaces air, producing a compression or rarefaction of the air that is sound.

A passage 730(1) may extend between the first cavity 720 and the second cavity 722. For example, the first transducer 182 may be arranged such that a passage 730(1) is present between a portion of the first transducer 182 and the enclosure 702. In another implementation the first cavity 720 and the second cavity 722 may be separated from one another by the first diaphragm, with no passage 730(1) present. In some implementations an acoustic mesh may be placed in the passage 730. For example, an acoustic mesh may be emplaced across the passage 730(1), permitting sound to be transferred but introducing an acoustic impedance.

The second transducer 184 is arranged proximate to the third outlet port 306(3). In one implementation the second transducer 184 may comprise a second diaphragm having a third side and a fourth side. A second driver, such as an electromagnet, may move the second diaphragm during operation to generate sound. As shown here, the third side of the second diaphragm is proximate to the third outlet port 306(3) while the fourth side is facing the interior of the second cavity 722.

The second diaphragm has a center that is a first distance to the third outlet port 306. A second distance may be determined from the center of the second diaphragm to the first outlet port 306(1). A third distance may be determined from the center of the second diaphragm to the second outlet port 306(2). In one implementation, the first distance is less than one or more of the second distance or the third distance. In some implementations, a plane of the second diaphragm or a frame of the second transducer 184 may be approximately coplanar to a plane described by the outlet port 306(3).

A passage 730(2) may extend between the second cavity 722 and the space between the third side of the second diaphragm and the portion of the back side 708 that is proximate to the third side. For example, the second transducer 184 may be arranged such that a passage 730(2) is present between the second cavity 722 and the third outlet port 306(3). In another implementation no passage 730(2) may be present. In some implementations, an acoustic mesh may be emplaced across the passage 730(2), permitting sound to be transferred but introducing an acoustic impedance.

As described above, the first transducer 182 and the second transducer 184 may have different characteristics. The first transducer 182 has a first range of operating frequencies extending from a first frequency to a second frequency. For example, the first transducer 182 may operate from the low frequency range 512 to include at least a portion of the high frequency range 514. The second transducer 184 has a second range of operating frequencies extending from a third frequency to a fourth frequency. The third frequency may be greater than the first frequency. For example, the second transducer 184 may operate only in the high frequency range 514.

The physical dimensions of one or more components of the first transducer 182 and the second transducer 184 may also differ. For example, the first diaphragm may be larger than the second diaphragm.

The volume (such as measured in cubic centimeters) may vary between the first cavity 720 and the second cavity 722. For example, the first cavity 720 may have a volume greater than the second cavity 722.

A first distance "L1" is shown from the front side 710 to the first transducer 182. A second distance "L2" is shown from the first transducer 182 to the second transducer 184. In some implementations, L1 is greater than L2, as shown here.

Figure 8:
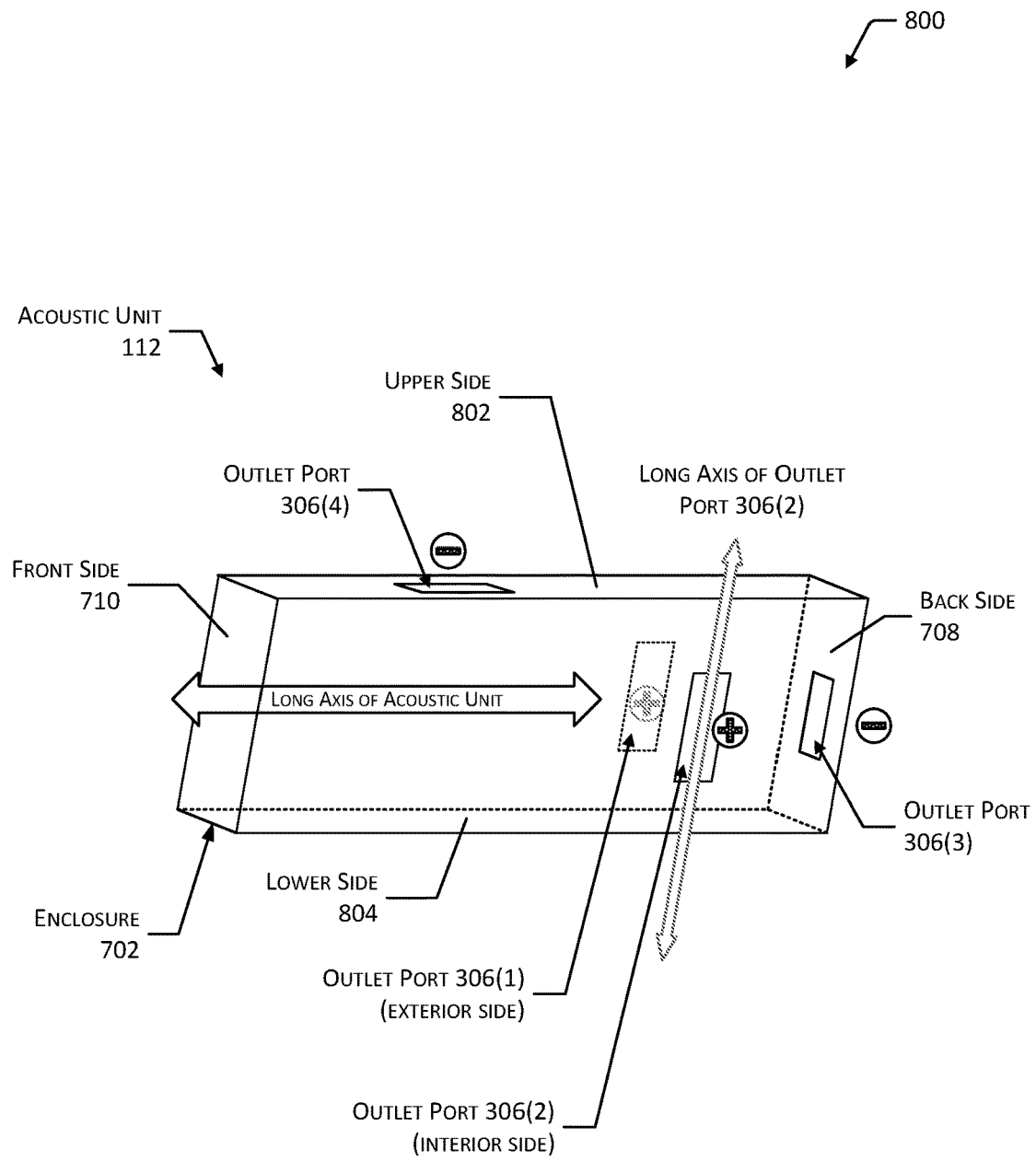
FIG. 8 illustrates a perspective view of the acoustic unit and relative placement of outlet ports, according to some implementations.

FIG. 8 illustrates a perspective view 800 of the acoustic unit 112 and relative placement of outlet ports 306, according to some implementations. Internal details of the acoustic unit 112 are omitted for clarity, and not necessarily as a limitation.

The front side 710, the back side 708, the upper side 802, and the lower side 804 are labeled. The fourth outlet port 306(4) is shown on the upper side 802 of the enclosure 702. The third outlet port 306(3) is shown on the back side 708. The first outlet port 306(1) on the exterior side 706 is shown. The second outlet port 306(2) on the interior side 704 is also shown. During normal use, the acoustic unit 112 is arranged such that the interior side 704 is proximate to the head 104 of the user 102. For example, the second outlet port 306(2) may be proximate to the ear of the user 102.

In this illustration, the first outlet port 306(1) and the second outlet port 306(2) are depicted as rectangular, having their respective long axes aligned. In other implementations the alignment of these ports may vary with respect to one another. The relative size of these ports may also vary. For example, the first outlet port 306(1) may have a smaller area than the second outlet port 306(2).

A long axis of the acoustic unit 112 may extend front-to-back, as shown here. A long axis of the second outlet port 306(2) is also shown, extending generally up-and-down. An angle between the long axis of the acoustic unit 112 and the long axis of the second outlet port 306(2) may be between 80 and 100 degrees.

In other implementations, other sizes, shapes, or configurations of the outlet ports 306 may be used. For example, the outlet ports 306(1) and 306(2) may be circular.

Some embodiments, or portions thereof, may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include but are not limited to signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case and a variety of alternative implementations will be understood by those having ordinary skill in the art.

Specific physical embodiments as described in this disclosure are provided by way of illustration and not necessarily as a limitation. Those having ordinary skill in the art readily recognize that alternative implementations, variations, and so forth may also be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features, structures, and acts are disclosed as exemplary forms of implementation.

What is claimed is:

1. A head-mounted wearable device comprising:
   a front frame;
   a first temple connected to the front frame, wherein the first temple comprises an acoustic unit comprising:
      an enclosure having an interior side, an exterior side, a back side, and an upper side, wherein the enclosure comprises a first cavity having a first volume and a second cavity having a second volume, wherein the first volume is greater than the second volume;
      a first outlet port in the exterior side that provides a first passageway between the second cavity and a surrounding environment;
      a second outlet port in the interior side that provides a second passageway between the second cavity and the surrounding environment;
      a third outlet port in the back side that provides a third passageway between the second cavity and the surrounding environment;
      a fourth outlet port in the upper side that provides a fourth passageway between the first cavity and the surrounding environment;
      a first transducer within the enclosure, wherein the first transducer at least partially separates the first cavity from the second cavity; and
      a second transducer within the enclosure, wherein the second transducer is proximate to the third outlet port;
   one or more memories storing first computer-executable instructions; and
   one or more hardware processors to execute the first computer-executable instructions to:
      determine first audio output data to be presented;
      determine a first equalization profile that is associated with operation of the first transducer, wherein the first equalization profile specifies gain at a first frequency that is below a threshold frequency;
      determine a second equalization profile that is associated with operation of the second transducer, wherein the second equalization profile specifies gain at a second frequency that is greater than the threshold frequency;
      determine first equalized audio output data by applying the first equalization profile to the first audio output data;
      determine second equalized audio output data by applying the second equalization profile to the first audio output data;
      operate the first transducer as an acoustic monopole using the first equalized audio output data; and
      operate the second transducer as an acoustic quadrupole using the second equalized audio output data.

2. The head-mounted wearable device of claim 1, the first transducer comprising:
   a first diaphragm having a first side and a second side;
   a first driver to move the first diaphragm during operation; and
   wherein the first side of the first diaphragm is proximate to the fourth outlet port; and
the second transducer comprising:
   a second diaphragm having a third side and a fourth side;
   a second driver to move the second diaphragm during operation; and
   wherein the third side of the second diaphragm is proximate to the third outlet port.

3. A system comprising:
   an enclosure comprising a first side, a second side, a third side, and a fourth side, wherein the enclosure comprises a first cavity having a first volume and a second cavity having a second volume;
   a first outlet port in the first side that provides a first passageway between the second cavity and a surrounding environment;
   a second outlet port in the second side that provides a second passageway between the second cavity and the surrounding environment;
   a third outlet port in the third side that provides a third passageway between the second cavity and the surrounding environment;
   a fourth outlet port in the fourth side that provides a fourth passageway between the first cavity and the surrounding environment;
   a first transducer that at least partially separates the first cavity from the second cavity; and
   a second transducer within the second cavity, wherein the second transducer is proximate to the third outlet port.

4. The system of claim 3, wherein:
the first transducer has a first range of operating frequencies extending from a first frequency to a second frequency; and
the second transducer has a second range of operating frequencies extending from a third frequency to a fourth frequency, and further wherein the third frequency is greater than the first frequency.

5. The system of claim 3, the first transducer comprising a first diaphragm having a first width; and
the second transducer comprising a second diaphragm having a second width that is less than the first width.

6. The system of claim 3, wherein the first volume is greater than the second volume; and further comprising:
a fifth outlet port that provides a fifth passageway between the first cavity and the surrounding environment.

7. The system of claim 3, wherein:
the first side is opposite the second side;
the third side is between the first side and the second side; and
the fourth side is between the first side and the second side.

8. The system of claim 3, the first transducer comprising:
a first diaphragm having a first side and a second side;
a first driver to move the first diaphragm during operation; and
wherein the first side of the first diaphragm is proximate to the fourth outlet port; and
the second transducer comprising:
a second diaphragm having a third side and a fourth side;
a second driver to move the second diaphragm during operation; and
wherein the third side of the second diaphragm is proximate to the third outlet port.

9. The system of claim 3, further comprising:
a first passage between the first cavity and the second cavity; and
a second passage between the third outlet port and the second cavity.

10. The system of claim 3, further comprising:
one or more memories storing computer-executable instructions; and
one or more hardware processors to execute the computer-executable instructions to:
determine first audio output data to be presented;
determine a threshold frequency;
determine second audio output data based on the first audio output data, wherein the second audio output data is associated with frequencies below the threshold frequency;
determine third audio output data based on the first audio output data, wherein the third audio output data is associated with frequencies above the threshold frequency;
operate the first transducer using the second audio output data; and
operate the second transducer using the third audio output data.

11. The system of claim 3, the second transducer comprising a diaphragm having a center; and
wherein a first distance from the center to the third outlet port is less than one or more of:
(i) a second distance from the center to the first outlet port, or
(ii) a third distance from the center to the second outlet port.

12. The system of claim 3, further comprising:
a front frame; and
a first temple attached with a first hinge to the front frame, wherein the enclosure is mounted to the first temple or incorporated into the first temple.

13. The system of claim 3, further comprising:
a front frame;
a visual indicator attached to the front frame;
a first temple attached with a first hinge to the front frame, wherein the enclosure is mounted to the first temple or incorporated into the first temple;
a pair of air conduction microphones within the first temple;
a capacitive touch sensor within the first temple; and
an inertial measurement unit within the first temple.

14. The system of claim 3, the enclosure further comprising a fifth side that is opposite the third side; and
wherein a first distance from the fifth side to the first transducer is greater than a second distance from the first transducer to the second transducer.

15. The system of claim 3, wherein:
the enclosure has a first long axis; and
the second outlet port has a second long axis, wherein an angle between the first long axis and the second long axis is from 80 degrees to 100 degrees.

16. A system comprising:
an enclosure comprising a first side, a second side, a third side, and a fourth side, wherein the enclosure comprises a first cavity, a second cavity, and a first passage between the first cavity and the second cavity;
a first outlet port in the first side that connects an interior of the second cavity with a surrounding environment;
a second outlet port in the second side that connects the interior of the second cavity with the surrounding environment;
a third outlet port in the third side that connects the interior of the second cavity with the surrounding environment;
a fourth outlet port in the fourth side that connects an interior of the first cavity with the surrounding environment;
a first transducer positioned between the first cavity and the second cavity; and
a second transducer in the second cavity and proximate to the third outlet port.

17. The system of claim 16, further comprising:
a fifth outlet port in the second side that connects the interior of the first cavity with the surrounding environment.

18. The system of claim 16, wherein:
the first transducer has a first range of operating frequencies extending from a first frequency to a second frequency; and
the second transducer has a second range of operating frequencies extending from a third frequency to a fourth frequency, and further wherein the third frequency is greater than the first frequency.

19. The system of claim 16, the enclosure further comprising a fifth side and a sixth side; and wherein:
the first side is opposite the second side;
the third side is opposite the fifth side;
the fourth side is opposite the sixth side;
the fourth side is above the sixth side;
the first side has a first edge adjacent to the fourth side;
the first side has a second edge adjacent to the sixth side; and
the first side is proximate to a user during use.

20. The system of claim 16, the first transducer comprising:
a first diaphragm having a first side and a second side;
a first driver to move the first diaphragm during operation; and
wherein the first side of the first diaphragm is proximate to the fourth outlet port; and the second transducer comprising:
a second diaphragm having a third side and a fourth side;
a second driver to move the second diaphragm during operation; and
wherein the third side of the second diaphragm is proximate to the third outlet port.

21. The system of claim 16, further comprising:
a second passage between the third outlet port and a portion of the interior of the enclosure that forms the second cavity.

22. A system comprising:
an enclosure comprising a first side, a second side, a third side, and a fourth side, wherein the enclosure comprises a first cavity, and a second cavity;
a first outlet port in the first side that connects an interior of the second cavity with a surrounding environment;
a second outlet port in the second side that connects the interior of the second cavity with the surrounding environment;
a third outlet port in the third side that connects the interior of the second cavity with the surrounding environment;
a passage between the third outlet port and a portion of the interior that forms the second cavity;
a fourth outlet port in the fourth side that connects an interior of the first cavity with the surrounding environment;
a first transducer positioned between the first cavity and the second cavity; and
a second transducer in the second cavity and proximate to the third outlet port.

* * * * *